(12) United States Patent
Li

(10) Patent No.: US 6,501,611 B1
(45) Date of Patent: Dec. 31, 2002

(54) DATA RECOVERY APPARATUS, METHOD AND MEMORY MEDIUM FOR A MAGNETIC MEMORY READ/WRITE CHANNEL

(75) Inventor: Robert Yuan-shih Li, Freemont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,293

(22) Filed: Apr. 27, 1999

(51) Int. Cl.[7] ................................. G11B 5/02
(52) U.S. Cl. .................. 360/67; 360/46; 360/53; 360/75; 360/25
(58) Field of Search ................... 360/67, 46, 53, 360/25, 75

(56) References Cited

U.S. PATENT DOCUMENTS

| | | | |
|---|---|---|---|
| 4,392,164 A | * 7/1983 | Lequien | 360/77.08 |
| 4,479,152 A | * 10/1984 | Chi | 360/46 |
| 4,772,964 A | 9/1988 | Kaida | |
| 4,786,990 A | 11/1988 | Overton et al. | |
| 4,933,783 A | 6/1990 | Yasui | |
| 4,991,034 A | 2/1991 | Sato | |
| 5,091,806 A | 2/1992 | Maeda et al. | |
| 5,293,278 A | 3/1994 | Pahr | |
| 5,455,816 A | 10/1995 | Bitting | |
| 5,488,518 A | 1/1996 | Shier | |
| 5,499,161 A | 3/1996 | Hosseinzadeh et al. | |
| 5,519,548 A | 5/1996 | Liepe et al. | |
| 5,533,031 A | * 7/1996 | Dounn et al. | 714/718 |
| 5,559,460 A | * 9/1996 | Cunningham | 327/179 |
| 5,696,643 A | * 12/1997 | Tsuwako et al. | 360/73.03 |
| 5,726,821 A | 3/1998 | Cloke et al. | |
| 5,831,781 A | * 11/1998 | Okamura | 360/31 |
| 6,084,733 A | * 7/2000 | Ohzeki et al. | 360/53 |
| 6,191,908 B1 | * 2/2001 | Tachikawa | 360/67 |
| 6,226,136 B1 | * 5/2001 | Chern | 360/25 |
| 6,265,869 B1 | * 7/2001 | Takahashi | 324/212 |

FOREIGN PATENT DOCUMENTS

JP 409245302 A * 9/1997 ............ G11B/5/02

* cited by examiner

Primary Examiner—David Hudspeth
Assistant Examiner—Dan I. Davidson
(74) Attorney, Agent, or Firm—Ohlandt, Greeley, Ruggiero & Perle, L.L.P.; Randall J. Bluestone

(57) ABSTRACT

A data recovery method for a read assembly of a magnetic memory device. The magnetic memory device has a moving magnetic medium, such as a disk, and a transducer spaced from the disk by a normal gap distance. The read assembly includes a variable gain amplifier and a control computer that controls the read and write operations of the magnetic memory device. The data recovery method uses the control computer to adjust the gain of the amplifier when an error is detected in a read signal. The method tests to see if the error is due to a variance from the normal gap distance by the head that is caused by either an thermal asperity of the disk surface or by a change in temperature of the moving magnetic medium. If a variance is found, the amplifier gain is adjusted and the data is reread. If there is no error the data is provided to an output interface.

15 Claims, 3 Drawing Sheets

DATA RECOVERY APPARATUS, METHOD AND MEMORY MEDIUM FOR A MAGNETIC MEMORY READ/WRITE CHANNEL

BACKGROUND OF INVENTION

1. Field of Invention

This invention relates to magnetic memory devices and, more particularly, to recovery of data when there is an error during a read operation.

2. Description of Prior Art

A magnetic memory device, such as a disk drive or a tape drive, typically has a magnetic head or transducer and a magnetic medium formatted into multiple data tracks. The magnetic medium is moved past a station where the transducer is located. The transducer is positioned to write or read data to or from addressable locations contained along the tracks.

The magnetic memory device also includes a read/write signal processing section that processes a read signal produced by the transducer before handing it over to a computer or other device that requested the data. The signal processing section includes a preamplifier for amplifying the read signal.

The signal to noise ratio (SNR) is a significant determinant of the read back performance of the magnetic memory device. For a given memory capacity design, a minimum SNR is usually required to meet the device's soft error rate target. A high amplitude output signal from the head can saturate the preamplifier to produce a distorted signal that increases noise, thereby resulting in a degraded SNR. If the amplitude of output signal from the head is too low for the voltage gain amplifier in the channel:, the SNR can also be degraded. Both of these conditions can lead to higher bit error rate. It is known that, due to bit crowding, the amplitude of the read signal varies with track location. For example, when the head is positioned above an inner track on a magnetic disk medium, the amplitude is low. When it is positioned above an outer track, the amplitude is high.

U.S. Pat. No. 4,772,964 deals with this situation by varying the gain of the preamplifier according to track position. A computer provides a gain value for each position of the transducer to the preamplifier. The gain value selects the value of a resistor that determines gain of the preamplifier. Thus, the gain is reduced for a high amplitude signal and is increased for a low amplitude signal. The gain is also adjusted based on the ambient temperature in which the magnetic memory device is situated. The temperature measurement is not needed when the ambient temperature is controlled to a constant temperature.

U.S. Pat. No. 5,519,548 discloses a procedure that uses read channel noise to calibrate amplifier gain and discrimination thresholds in the read/write signal processing circuitry of a magnetic memory device. The calibration procedure achieves a final threshold value that ensures that the read signal must exceed a predetermined signal to noise ratio before the read signal is accepted as valid. The calibration procedure is performed before searching for a head alignment reference signal on the magnetic medium.

Neither of the aforementioned patents addresses recovery of errors caused by variations in spacing or gap between the head and the disk surface due to debris, asperity of the disk surface or due to temperature and pressure change in the hard disk drive.

It is an object of the present invention to provide an apparatus that recovers the data of a read signal that is in error due to variations in head to disk gap caused by disk surface asperity or hard disk drive temperature/pressure change and to thermal asperity events.

It is another object of the present invention to provide a method of recovering the data of a read signal that is in error due to variations in head to disk gap caused by disk surface asperity or hard disk drive temperature/pressure change and to thermal asperity events.

It is another object of the present invention to provide a memory medium that stores a program that controls the signal processing section of a read/write channel to recover the data of a read signal that is in error due to variations in head to disk gap caused by disk surface asperity or hard disk drive temperature/pressure change and to thermal asperity events.

SUMMARY OF INVENTION

A method for recovering data according to the present invention is operative during a read operation of a magnetic memory device when an error is detected. The magnetic memory device has a moving magnetic medium upon which data is stored at addressable locations, a transducer for reading the data to produce a read signal and an adjustable gain amplifier for amplifying the read signal. The transducer is spaced from the moving medium by a normal gap distance.

The data recovery method of the present invention involves producing a first read signal by reading a first data from one of the addressable locations. Next, the first read signal is examined for an error. If an error is detected, the method tests for a variation from the normal gap distance. If a variation is found, the amplifier gain is adjusted dependent upon the variation. Next, the first data is reread to produce a second read signal. It is then determined if the second read signal is error free. If the second read signal is error free, the first data is recovered from the second read signal and provided to an output of the magnetic memory device.

The variation from the normal gap distance can be caused by an asperity of the magnetic medium surface, such as an accumulation of debris or a roughness or unevenness. In such case, the variation is a decrease from the normal gap distance that results in a higher amplitude read signal that saturates the amplifier. For this situation, the amplifier gain is decreased.

The variation from the normal gap distance can be caused by a change in disk temperature from a reference temperature, such as the medium temperature at the time of manufacture, and the moving medium. If the temperature increases, the gap decreases and the amplifier gain is decreased. If the temperature decreases, the gap increases and the amplifier gain is increased.

The data recovery apparatus and memory medium of the present invention involve the procedure described above for the data recovery method.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
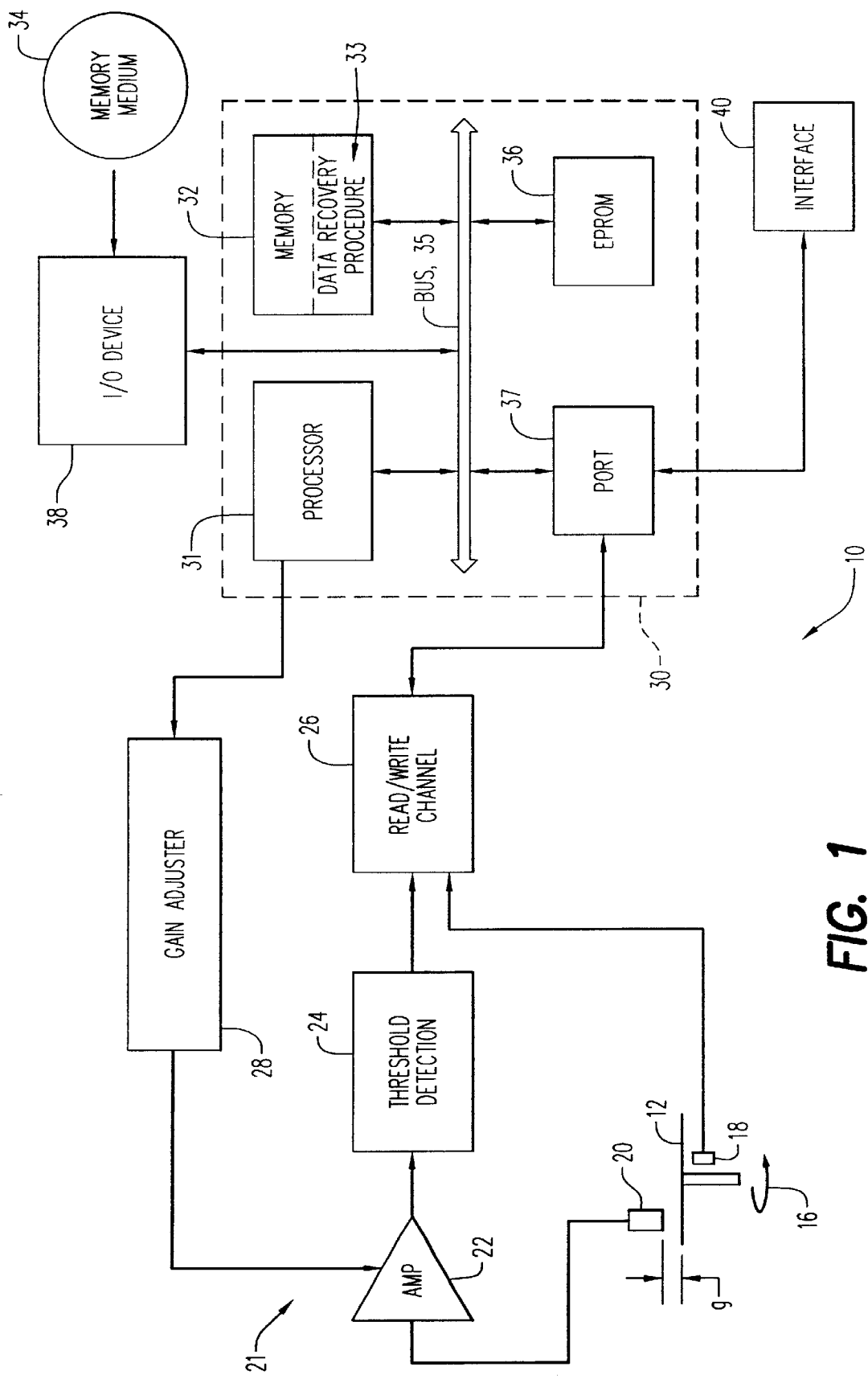
FIG. 1 is a block diagram of a magnetic memory device according to the present invention.

With reference to FIG. 1, there is provided a magnetic storage device generally represented by numeral 10. Although the data recovery apparatus, method and memory medium of the present invention is applicable to either magnetic disk or magnetic tape memory devices, magnetic memory device 10 is shown, by way of example, as a magnetic disk memory device.

Magnetic memory device 10 has a magnetic disk 12 that is rotated by a spindle 14 driven by a motor (not shown). Magnetic disk 12 rotates in the direction shown by arrow 16. A temperature sensor 18 is located in proximity to spindle 14 and magnetic disk 12 to sense the temperature of magnetic disk 12. A transducer 20 is arranged to write and/or read data to or from addressable locations on magnetic disk 12 in a conventional manner. Transducer 20 is preferably a magnetoresistive (MR) head.

Transducer 20 is electrically coupled with a read/write signal processing assembly 21. Transducer 20 and read/write signal processing assembly 21 may be physically housed in an arm assembly (not shown). The arm assembly can be moved under control of read/write signal processing assembly 21 and motors (not shown) to position transducer 20 to write and/or read data to or from different cylindrical tracks along magnetic disk 12.

Read/write signal processing assembly 21 includes a preamplifier 22, a threshold detector 24, a read/write channel 26, a control computer 30, a gain adjuster 28 and an interface 40. Control computer 30 controls the positioning of transducer 20 to an addressable location along magnetic disk 12 and the operation of preamplifier 22, read/write channel 26 and gain adjuster 28 during read and write operations.

The data recovery feature of the present invention is concerned with the recovery of data when an error is detected in a read signal produced by transducer 20. In particular, these errors arise from read signals that have an amplitude that is too low to be detected or that is so high as to saturate preamplifier 22. In either case an error is detected.

A high or a low amplitude of a read signal can arise when transducer 20 varies in spacing to magnetic disk 12 from a normal gap distance g. The gap distance g is selected during design for an optimum read signal output from transducer 20. However various factors can contribute to variances from the gap distance g that can produce the aforementioned errors in the read signal. One such factor involves the surface of magnetic disk 12 that may contain an asperity due to an accumulation of debris or to a roughness or unevenness. An asperity condition causes the MR head to heat frictionally or to cool through conduction and, for this reason, is called thermal asperity. If data is read while a thermal asperity condition is present, the read signal amplitude will include high amplitude spikes or transients that may saturate preamplifier 22.

Another factor involves changes in temperature of magnetic disk 12. During a normal read operation, an air flow caused by rotation of magnetic disk 12 provides a fly lift to transducer 20 that elevates it to approximately the selected gap distance g. If the temperature of disk 20 increases from the reference temperature (say, by 10° C.), the air above the rotating disk becomes hotter. This causes the fly height to decrease enough to result in a high enough read signal amplitude to saturate preamplifier 22, thereby causing an error. If the disk temperature decreases, the fly height increases and the read signal amplitude decreases. If the decrease is significant, the signal amplitude could be low enough to cause an error. Depending on the bearing design, altitude from sea level or barometric pressure may have similar effects as temperature on the magnetic spacing. The reference temperature may, for example, be the prevailing temperature of disk 12 during manufacture.

To determine if a thermal asperity condition is present, threshold detector 24 is provided to detect transient signals that exceed a threshold for a time duration long enough (for example, one or more bit times) to cause an error in a read signal. The threshold value is set to a value in a range from the amplitude of an average read signal expected for the operating range of preamplifier 22 to the amplitude level that just saturates preamplifier 22. The output of threshold detector 24 is applied to read/write channel 26 and ultimately to control computer 30 for use in the data recovery procedure.

The disk temperature is sensed by temperature sensor 18. The output of temperature sensor 18 is applied to read/write channel 26 and ultimately to control computer 30 for use in the data recovery procedure. Read/write channel 26 includes an analog to digital converter to convert analog signals, such as the temperature signal output of temperature sensor 18, into a digital signal for use by control computer 30.

Preamplifier 22 has a variable gain that is controlled by control computer 30 and gain adjuster 28. For example, the gain of preamplifier 22 may suitably be determined by the value of a variable resistor connected in a gain control circuit of preamplifier 22. The variable resistor may comprise a resistor network that is configurable into a resistor having a desired gain value in response to a digital gain value provided by control computer 30. Thus, gain adjuster 28 may include a decoder that decodes the digital gain value to provide one or more signals that operate one or more switches to configure the resistor network to have the desired gain value.

Control computer 30 includes a processor 31, a memory 32, an EPROM 36 and a communication port 37, all of which are interconnected via a computer bus 35. Generally, processor 31 operates under the control of programs stored in memory 32 to control the various tasks involved in read and write operations of magnetic memory device 10 in accordance with various design parameters contained in EPROM 36. To control these tasks, processor communicates with read/write channel 26 and interface 40 by way of communication port 37.

A data recovery program 33 is stored in memory 32. Data recovery program 33 is operable to control processor 31 to conduct a data recovery procedure in accordance with the present invention. Data recovery program 33 may be stored on a memory medium 34 for installation in memory 32 by way of input/output I/O devices 38. I/O devices 38 may be coupled with bus 35 at the time of assembly of read/write signal processing assembly 21 or at a later time via connectors (not shown) available to the outside world.

Figure 2:
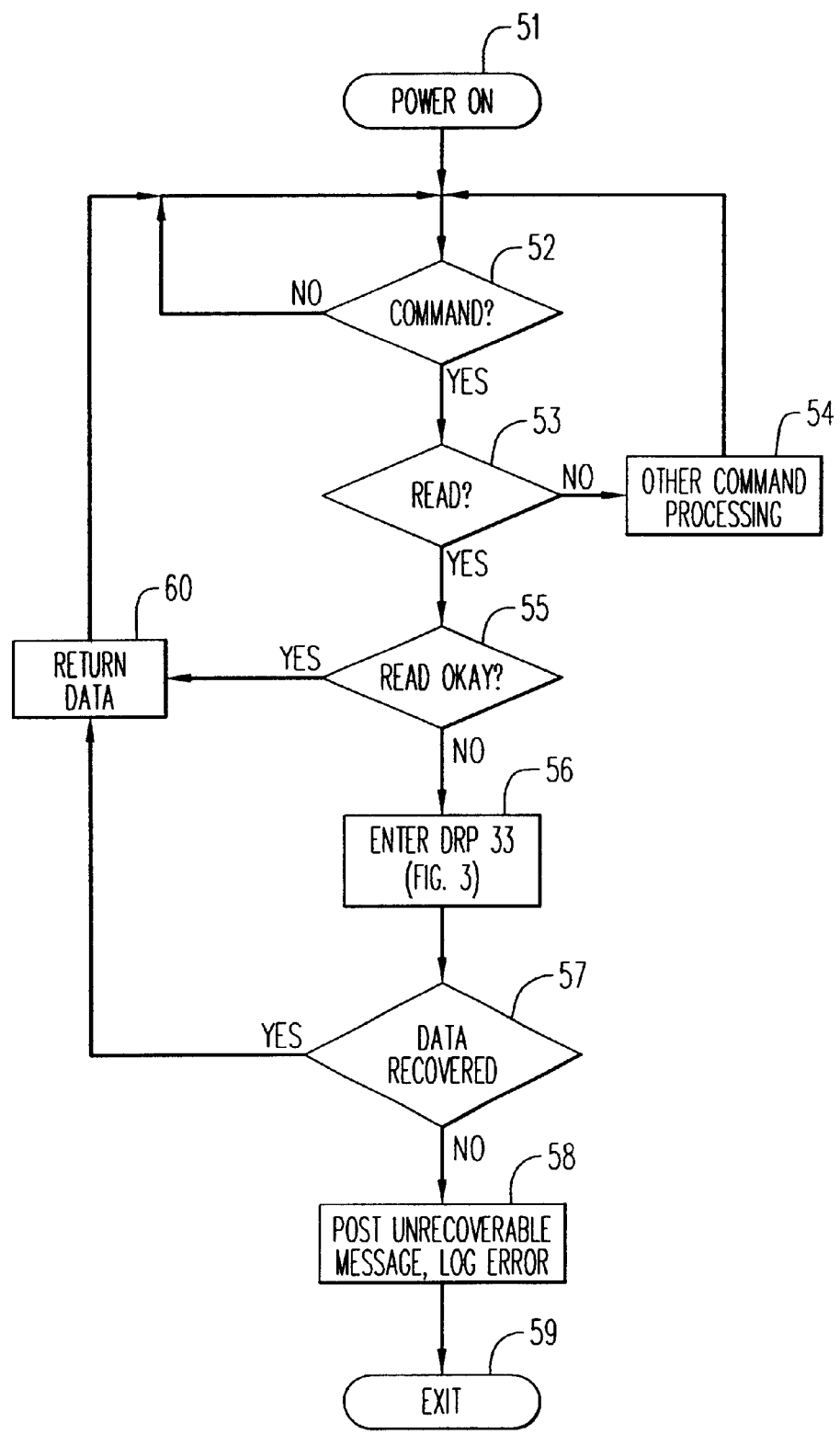
FIG. 2 is a flow diagram of the operation of the FIG. 1 magnetic memory device.

Referring to FIG. 2, a system program 50 begins at step 51 when the power is turned on for magnetic memory device 10. At step 52, a test is performed for the presence of a command. If no command is present, step 52 is periodically repeated until a command is found. When a command is found, step 53 determines if it is a read command. If not, it is classified as another command, such as a write command. Step 54 processes the other command. After step 54 is completed, step 52 resumes its test for a command.

If step 53 determines the command to be a read command, step 55 then determines if the read signal is okay. If so, step 60 returns the read data to interface 40. If the read signal is not okay (i. e., there is a read error), the data recovery program 33 is entered at step 56. When the data recovery program has been run, step 57 determines if the read data has been recovered. If so, the data is returned at step 60 to interface 40. If step 57 determines that the data has not been recovered, step 58 posts an unrecoverable message and logs an error. The system program is then exited at step 59 and remedial action taken.

Figure 3:
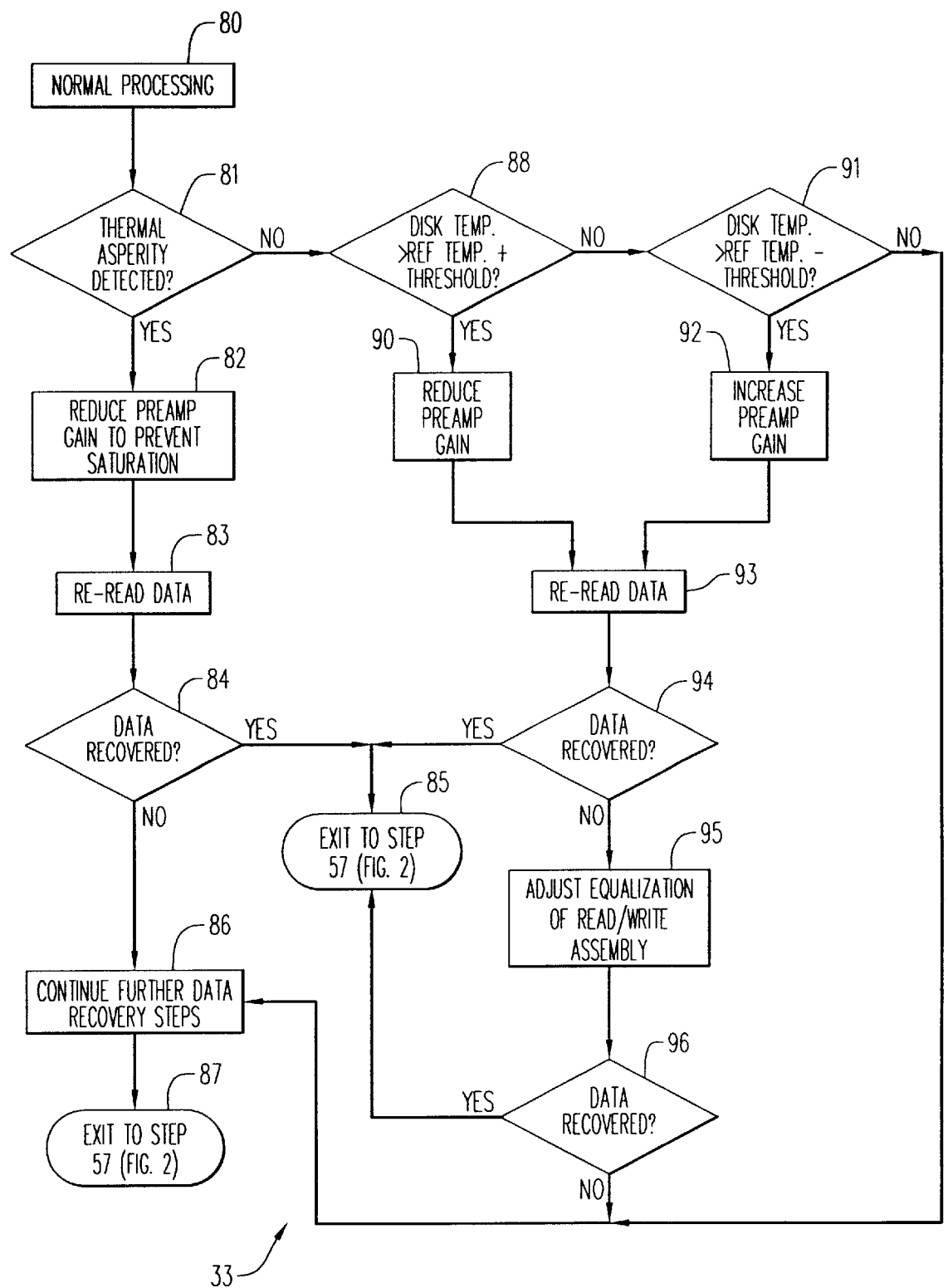
FIG. 3 is a flow diagram of the data recovery procedure of the FIG. 2 flow diagram.

Referring to FIG. 3, data recovery program begins with step 80 where normal data recovery processing is conducted. At step 81, it is determined if a thermal asperity condition has been detected. That is, the output of threshold detector 24 is examined for the presence of a thermal asperity condition. If there is a thermal asperity condition, step 82 reduces the gain of preamplifier 22 to prevent the thermal asperity from saturating preamplifier 22. The data is reread at step 83. At step 84, it is determined if the data has been recovered. If so, step 85 exits the data recovery program to step 57 of system program 50 in FIG. 2. If step 84 determines that the data is not recovered, step 86 continues the remainder of the data recovery steps that are not pertinent to the present invention. When these steps are completed, step 87 exits the data recovery program to step 57 of system program 50 in FIG. 2.

If step 81 determines that there is no thermal asperity condition, step 88 then determines if the disk temperature is greater than the reference temperature plus a threshold (for example, 10° C.). If the disk temperature is not greater, step 91 determines if the disk temperature is less than the reference temperature minus a threshold (for example, 10° C.). If the disk temperature is not lesser, there is no meaningful variance from the gap distance g due to either a thermal asperity or to a temperature change. Step 86 then continues with the further data recovery steps as described above.

If step 88 determines that there has been a disk temperature increase above the reference temperature by the threshold, the preamplifier gain is reduced at step 90. On the other hand, if step 91 determines that there has been a disk temperature decrease below the reference temperature by the threshold, the preamplifier gain is increased at step 90. After the gain adjustment by either step 90 or step 92, the data is reread by step 93. The next step 94 determines if the data has been recovered. If the data has been recovered, step 85 exits data recovery program 33 to step 57 of system program 50 in FIG. 2.

If step 94 determines that the data is not recovered, step 95 adjusts the equalization of read/write assembly 21 as by making adjustments for variations in pulse width of the read signal. The data is then reread. Step 96 determines if the data has been recovered. If the data has been recovered, step 85 exits data recovery program 33 to step 57 of system program 50 in FIG. 2. If the data has not been recovered by step 95, step 86 continues with the further DRP steps as discussed above.

The present invention having been thus described with particular reference to the preferred forms thereof, it will be obvious that various changes and modifications may be made therein without departing from the spirit and scope of the present invention as defined in the appended claims. For example, the data recovery procedure, though described herein for one gain selection try, may employ more gain selection tries for either the thermal asperity condition or the disk temperature change condition before step 86 is performed in FIG. 3.

What is claimed is:

1. A method for recovering data during a read operation of a magnetic memory device when an error is detected, said magnetic memory device having a moving magnetic medium upon which data is stored at addressable locations, a transducer for reading said data to produce a read signal and an amplifier for amplifying said read signal, said transducer being spaced from said moving medium by a normal gap distance, said amplifier having an adjustable gain, said method comprising:

producing a first read signal by reading a first data from one of said addressable locations;

detecting an error in said first read signal;

testing for a variation from said normal gap distance, wherein said testing tests for a thermal asperity of said moving magnetic medium;

adjusting the gain of said amplifier to reduce the effect of said variation wherein said adjusting decreases said gain when said variation from said normal gap distance is a decrease in gap distance;

rereading said one location to produce a second read signal;

determining if said second read signal is error free; and providing said first data to an output of said magnetic memory device if said determining step determines that said second read signal is error free.

2. A method for recovering data during a read operation of a magnetic memory device when an error is detected, said magnetic memory device having a moving magnetic medium upon which data is stored at addressable locations, a transducer for reading said data to produce a read signal and an amplifier for amplifying said read signal, said transducer being spaced from said moving medium by a normal gap distance, said amplifier having an adjustable gain, said method comprising:

producing a first read signal by reading a first data from one of said addressable locations;

detecting an error in said first read signal;

testing for a variation from said normal gap distance, wherein said testing tests for a change in temperature of said moving medium by a threshold value relative to a reference temperature;

adjusting the gain of said amplifier to reduce the effect of said variation, wherein said adjusting decreases said gain when said variation is due to a temperature increase and increases said gain when said variation is due to a temperature is a decrease;

rereading said one location to produce a second read signal;

determining if said second read signal is error free; and providing said first data to an output of said magnetic memory device if said determining step determines that said second read signal is error free.

3. A read assembly for a magnetic memory device having a moving magnetic medium upon which data is stored at addressable locations, said read assembly comprising:

a transducer for reading a first data from one of said locations to produce a first read signal, said transducer being spaced from said moving medium by a normal gap distance, an amplifier for amplifying said first read signal, said amplifier having an adjustable gain;

a gain adjuster for adjusting said gain, an interface;

a control computer, said control computer:

detecting an error in said first read signal, testing said first read signal to determine therefrom a variation from said normal gap distance, providing a gain value to said gain adjuster, said gain value set to reduce an effect of said variation, causing said read transducer to reread said first data to produce a second read signal, determining if said second read signal is error free, and, if yes, dispatching said first data to said interface; and a temperature sensor for providing to said control computer a temperature signal indicative of the moving magnetic medium, wherein said control computer tests for said variation by comparing said moving magnetic medium temperature signal with a reference temperature plus or minus a threshold.

4. The read assembly of claim 3, wherein said gain value decreases said gain when said temperature change is an increase and increases said gain when said temperature change is a decrease.

5. A read assembly for a magnetic memory device having a moving magnetic medium upon which data is stored at addressable locations, said read assembly comprising:

transducer for reading a first data from one of said locations to produce a first read signal, said transducer being spaced from said moving medium by a normal gap distance, an amplifier for amplifying said first read signal, said amplifier having an adjustable gain;

a gain adjuster for adjusting said gain, an interface;

a control computer, said control computer:

detecting an error in said first read signal, testing said first read signal to determine therefrom a variation from said normal gap distance, providing a gain value to said gain adjuster, said gain value set to reduce an effect of said variation, causing said read transducer to reread said first data to produce a second read signal, determining if said second read signal is error free, and, if yes, dispatching said first data to said interface; and a threshold detector for providing to said control computer a gap signal indicative of a thermal asperity of said magnetic medium that causes said variation, wherein said control computer uses said gap signal to test for said variation and said gain value decreases said gain when said variation from said normal gap distance is a decrease in gap distance.

6. A memory medium including program instructions for controlling a computer that controls the read/write operations of a magnetic memory device, said magnetic memory device having a moving magnetic medium upon which data is stored at addressable locations, a transducer for reading a first data from one of said locations to produce a first read signal and an amplifier for amplifying said first read signal, said amplifier having an adjustable gain, and said transducer being spaced from said moving medium by a normal gap distance, said memory medium comprising:

program instructions for controlling said computer to detect an error in said first read signal;

program instructions for controlling said computer to test for a variation from said normal gap distance;

program instructions for controlling said computer to adjust the gain of said amplifier dependent upon said variation;

program instructions for controlling said computer to cause said transducer to reread said one location to produce a second read signal;

program instructions for controlling said computer to determine if said second read signal is error free; and program instructions for controlling said computer to provide said first data to an output of said magnetic memory device if said determining step determines that said second read signal is error free, wherein said gain is decreased when said variation from said normal gap distance is a decrease in gap distance due to a thermal asperity of the moving magnetic medium.

7. The memory medium of claim 6, wherein said gain is decreased when said variation is due to an increase in temperature of the moving magnetic medium above a reference temperature by a threshold and wherein said gain is increased when said variation is due to a decrease in temperature of the moving magnetic medium below said reference temperature by a threshold.

8. The memory medium of claim 7, further comprising program instructions for controlling said computer to post an unrecoverable message in the event said second read signal is not error free.

9. A method for adjusting gain of a variable gain amplifier disposed in a read circuit of a magnetic memory device that has a moving magnetic medium upon which data is stored and a transducer for reading said data, said transducer being spaced from said moving medium by a normal gap distance, said method comprising:

detecting an error in a signal produced by said transducer;

testing for a variation from said normal gap distance due to a thermal asperity of said moving magnetic medium; and adjusting the gain of said amplifier to reduce the effect of said variation by decreasing said gain when said variation from said normal gap distance is a decrease in gap distance.

10. A method for adjusting gain of a variable gain amplifier disposed in a read circuit of a magnetic memory device that has a moving magnetic medium upon which data is stored and a transducer for reading said data said transducer being spaced from said moving medium by a normal gap distance, said method comprising:

detecting an error in a signal produced by said transducer;

sensing a temperature indicative of said moving magnetic medium;

testing for a variation from said normal gap distance by comparing said temperature to a reference temperature plus or minus a threshold; and adjusting the gain of said amplifier to reduce the effect of said variation.

11. The method of claim 10, wherein said gain adjusting step decreases said gain when a temperature change detected by said testing step is an increase and increasing said gain when said temperature change is a decrease.

12. A read assembly for a magnetic memory device having a moving magnetic medium upon which data is stored, said read assembly comprising:

a transducer for producing a signal, said transducer being spaced from said moving medium by a normal gap distance, an amplifier for amplifying said signal, said amplifier having an adjustable gain; and a control computer for performing the operations of:
  detecting an error in said signal produced by said transducer;
  testing for a variation from said normal gap distance due to a thermal asperity of said moving magnetic medium; and
  adjusting the gain of said amplifier to reduce the effect of said variation by decreasing said gain when said variation from said normal gap distance is a decrease in gap distance.

13. A read assembly for a magnetic memory device having a moving magnetic medium upon which data is stored, said read assembly comprising:
  a transducer for producing a signal, said transducer being spaced from said moving medium by a normal gap distance,
  an amplifier for amplifying said signal, said amplifier having an adjustable gain;
  a temperature sensor for sensing a temperature signal indicative of said moving magnetic medium; and
  a control computer for performing the operations of:
  detecting an error in said signal produced by said transducer;
  testing for a variation from said normal gap distance by comparing said temperature signal to a reference temperature plus or minus a threshold; and
  adjusting the gain of said amplifier to reduce the effect of said variation.

14. The read assembly of claim 13, wherein said adjusting operation decreases said gain when a temperature change detected by said testing operation is an increase and increases said gain when said temperature change is a decrease.

15. A method for recovering data during a read operation of a magnetic memory device when an error is detected, said magnetic memory device having a moving magnetic medium upon which data is stored at addressable locations, a transducer for reading said data to produce a read signal and an amplifier for amplifying said read signal, said transducer being spaced from said moving medium by a normal gap distance, said amplifier having an adjustable gain, said method comprising:
  producing a first read signal by reading a first data from one of said addressable locations;
  detecting an error in said first read signal;
  sensing a temperature indicative of said moving magnetic medium;
  testing for a variation from said normal gap distance;
  adjusting the gain of said amplifier to reduce the effect of said variation;
  rereading said one location to produce a second read signal;
  determining if said second read signal is error free; and
  providing said first data to an output of said magnetic memory device if said determining step determines that said second read signal is error free, wherein said testing tests for said variation by comparing said temperature indicative of said moving magnetic medium to a reference temperature plus or minus a threshold.

* * * * *